(12) United States Patent
Darrer et al.

(10) Patent No.: US 9,855,802 B2
(45) Date of Patent: Jan. 2, 2018

(54) RFID-TAG, A TPMS DEVICE, A TIRE, A RECEIVER DEVICE AND A METHOD FOR PROVIDING INFORMATION RELATED TO IDENTIFICATION OF A TIRE

(71) Applicant: Infineon Technologies AG, Neubiberg (DE)

(72) Inventors: Franz Michael Darrer, Graz (AT);
Gerald Holweg, Graz (AT);
Ralf-Rainer Schledz, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/011,789

(22) Filed: Feb. 1, 2016

(65) Prior Publication Data

US 2016/0144674 A1    May 26, 2016

Related U.S. Application Data

(63) Continuation of application No. 13/916,801, filed on Jun. 13, 2013, now Pat. No. 9,248,709.

(51) Int. Cl.
*B60C 23/00* (2006.01)
*B60C 23/04* (2006.01)
(Continued)

(52) U.S. Cl.
CPC .......... *B60C 23/0486* (2013.01); *B60C 19/00* (2013.01); *B60C 23/0418* (2013.01);
(Continued)

(58) Field of Classification Search
CPC . B60C 23/04; B60C 23/0408; B60C 23/0433; B60C 23/0479; B60C 23/0493;
(Continued)

(56) References Cited

U.S. PATENT DOCUMENTS

| 5,541,574 A | 7/1996 | Lowe et al. |
| 6,087,930 A | 7/2000 | Kulka et al. |

(Continued)

FOREIGN PATENT DOCUMENTS

| CN | 2399714 Y | 10/2000 |
| CN | 1583435 A | 2/2005 |

(Continued)

OTHER PUBLICATIONS

Tire Code, http://en.wikipedia.org/wiki/Tire_code, pp. 1-10, as obtained on Jun. 13, 2013,.

(Continued)

*Primary Examiner* — Thomas Mullen
(74) *Attorney, Agent, or Firm* — Eschweiler & Potashnik, LLC

(57) ABSTRACT

Embodiments relate to a Radio Frequency IDentification (RFID)-tag, a Tire Pressure Monitoring System (TPMS) device, a tire, a receiver device and a method for providing information related to identification of a tire. The RFID-tag is configured to provide information related to the tire identification and it is configured to be powered by the TPMS device. The RFID-tag comprises a memory module configured to store the information related to the tire identification and a transmitter module configured to transmit the information related to the tire identification to a receiver device of a vehicle or a service station. The TPMS device comprises a coupling element configured to provide Radio Frequency power to the RFID-tag, for providing information related to tire identification.

19 Claims, 10 Drawing Sheets

(51) Int. Cl.

| | | |
|---|---|---|
| *G06K 19/077* | (2006.01) | |
| *G06K 19/07* | (2006.01) | |
| *G06K 7/10* | (2006.01) | |
| *B60C 19/00* | (2006.01) | |

(52) U.S. Cl.
CPC ...... *B60C 23/0433* (2013.01); *G06K 7/10158* (2013.01); *G06K 19/0708* (2013.01); *G06K 19/07764* (2013.01)

(58) Field of Classification Search
CPC ............ B60C 23/0415; B60C 23/0416; B60C 23/0486; B60C 23/0418; B60C 19/00; G07C 5/008; G07C 5/0808; G06K 19/07764; G06K 19/0708; G06K 7/10158
USPC ........................................................ 340/447
See application file for complete search history.

(56) References Cited

U.S. PATENT DOCUMENTS

| | | | |
|---|---|---|---|
| 6,724,301 B2 | 4/2004 | Ginman et al. | |
| 7,104,438 B2 | 9/2006 | Benedict | |
| 7,504,947 B2 | 3/2009 | Tucker | |
| 7,513,145 B2 | 4/2009 | Katou et al. | |
| 7,693,626 B2 | 4/2010 | Breed et al. | |
| 8,077,025 B2 | 12/2011 | Hammerschmidt et al. | |
| 8,299,910 B2 | 10/2012 | Hammerschmidt et al. | |
| 8,573,045 B2 | 11/2013 | Gotschlich | |
| 8,737,747 B2 * | 5/2014 | Bulan ................. | G01M 17/027 382/155 |
| 2002/0092347 A1 * | 7/2002 | Niekerk ................ | B60C 23/009 73/146.2 |
| 2004/0111276 A1 * | 6/2004 | Inge ..................... | G06Q 10/087 702/155 |
| 2005/0242939 A1 | 11/2005 | Hagl et al. | |
| 2005/0280523 A1 | 12/2005 | Watabe | |
| 2006/0042734 A1 | 3/2006 | Turner et al. | |
| 2007/0069879 A1 | 3/2007 | Kuchler | |
| 2007/0156312 A1 | 7/2007 | Breed et al. | |
| 2008/0252435 A1 | 10/2008 | Chien et al. | |
| 2009/0021363 A1 * | 1/2009 | Heise ................. | B60C 23/0416 340/447 |
| 2010/0134269 A1 | 6/2010 | Zhu et al. | |
| 2010/0308987 A1 | 12/2010 | Haas et al. | |
| 2013/0056703 A1 | 3/2013 | Elian et al. | |
| 2014/0170446 A1 | 6/2014 | Elian et al. | |
| 2014/0342203 A1 | 11/2014 | Elian | |
| 2015/0004451 A1 | 1/2015 | Elian et al. | |

FOREIGN PATENT DOCUMENTS

| | | |
|---|---|---|
| CN | 2841383 Y | 11/2006 |
| CN | 1872573 A | 12/2006 |
| CN | 2873541 Y | 2/2007 |
| CN | 2904127 Y | 5/2007 |
| CN | 202217318 U | 5/2012 |

OTHER PUBLICATIONS

Infineon Technologies AG, "New Infineon 'Coil on Module' Chip Package Simplifies Manufacturing of Robust Dual Interface Bank and Credit Cards; Supports Global Introduction of Contactless Payment Applications", available at http://www.infineon.com/cms/en/corporate/press/news/releases/2013/INFCCS20 1301-023.html, 3 pages, dated Jan. 29, 2013, copyright 1999-2013.

Notice of Allowance dated Sep. 28, 2015 U.S. Appl. No. 13/916,801.

Non-Final Office Action dated May 26, 2015 U.S. Appl. No. 13/916,801.

Non-Final Office Action dated Feb. 2, 2015 U.S. Appl. No. 13/916,801.

Non-Final Office Action dated Sep. 23, 2014 U.S. Appl. No. 13/916,801.

* cited by examiner

RFID-TAG, A TPMS DEVICE, A TIRE, A RECEIVER DEVICE AND A METHOD FOR PROVIDING INFORMATION RELATED TO IDENTIFICATION OF A TIRE

REFERENCE TO RELATED APPLICATION

This application is a Continuation of U.S. parent application Ser. No. 13/916,801 (U.S. Pat. No. 9,248,709) filed on Jun 13, 2013, the contents of which are incorporated by reference in their entirety.

FIELD

Embodiments of the present invention relate to an RFID-tag, a TPMS Device, a tire, a receiver device and a method for providing information related to identification of a tire.

BACKGROUND

Nowadays, variations in types and sizes of tires for vehicles are manifold. Tires are used for all kinds of vehicles, such as cars, trucks, bikes, airplanes, construction vehicles, etc. In some of the applications of tires, the differences in size and form are marginal. Therefore codes are used to distinguish the different tires. For example, automobile tires can be identified using alphanumeric tire codes, which are written on the side wall of the tire. The writing can be done in form of moldings or embossments on the side walls of the tires. Such a code may specify the dimensions of the tire as well as limitations of the tire, as, for example, a maximum speed, a maximum load, etc. Some of the codes used on conventional tires may comprise metrical and imperial lettering and numbering schemes.

SUMMARY

Embodiments are based on the finding that tire identification codes may be read from the tire by the user, however, there is the desire to automatically determine the identification codes of a tire or even identify the individual tire. For example, a leasing company may have a desire to automatically identify the tires of a returned leased car, in order to make sure that the original tires are still on the vehicle. Generally, there may be a desire for the driver of a vehicle to be warned when the limitations of a tire are exceeded, for example, in terms of a maximum speed or a maximum load. Hence, there is a desire that a control system of a vehicle is provided with tire identification information. In other words, a permanent individual identification of a tire may be desired. Bar codes or any other codes written in some form on the tire may be non-permanent and it may therefore not be permanently monitored by a vehicle over a longer time period, such as a lifetime of a tire. It is another finding that there is a desire to run compatibility checks and adaptations to tire properties by a vehicle. It is yet another finding, that there may be another desire for a service station to be informed about the tire identification, be it just for checking a stock for similar tires automatically.

Embodiments of the present invention are based on the finding that a Radio Frequency IDentification (RFID)-tag can be used to store and provide information related to a tire identification. It is yet another finding that a Tire Pressure Monitoring System (TPMS) module can be used to power an RFID-tag mounted into the tire. It is a further finding that information related to the tire identification can be stored in an RFID-tag, which may then provide said information to an according receiver device, which can, for example, be in a vehicle or a service station.

Some embodiments relate to an RFID-tag for providing information related to an identification of a tire. The RFID-tag is configured to be powered by a TPMS device. The RFID-tag comprises a memory module which is configured to store the information related to the tire identification. In embodiments the memory module may correspond to a memory unit, a memory device, any means for storing, etc. That is to say the memory module may correspond to any means capable of storing information. In embodiments said information may correspond to a tire code or a tire identification number. In some embodiments said information can be digital, i.e. it may be represented by a number of binary values or bits. In embodiments the memory module may be non-volatile, for example, it may correspond to a Read Only Memory (ROM). In embodiments any memory is conceivable, for example, Electronically Programmable Read Only Memory (EPROM), Electronically Erasable Programmable Read Only Memory (EEPROM), flash memory, etc. The RFID-tag further comprises a transmitter module configured to transmit the information related to the tire identification to a receiver device, for example, the receiver device may be of a vehicle or a service station. In embodiments the transmitter module can correspond to any transmitter device, transmitter unit, etc. For example, the transmitter module may correspond to any means for transmitting. In embodiments the transmitter module may comprise typical transmitter components, such as one or more transmission antennas or coils, a power amplifier, a filter, etc. As will be detailed subsequently, this or another transmitter module may also be configured to transmit response messages upon reception of one or more instructions, such as wake-up or activation instructions received using an accordingly configured receiver module at the RFID-tag.

Embodiments may therefore allow to wirelessly transmit information related to tire identification and to make said information available to a receiver device. For example, a vehicle or a service station may then make use of the information and verify that a specific or particular tire is present or that its properties lie within certain limitations. With the information related to the tire identification further information, for example, on the load capability or maximum speed of the tire may be made available as well. Hence, embodiments may enable load and speed verifications while the tire is in use or in drive. For example, a control system of a vehicle may warn a driver when a maximum speed or load of a tire is exceeded. Embodiments may thus also provide a control system for a vehicle configured to verify that a tire is operated within its specified limitations and generate a warning if not.

In some embodiments the RFID-tag may further comprise a power module which is configured to power the RFID-tag by receiving energy through a coupling element, e.g. an antenna or coil, from the TPMS device. For example, the RFID-tag may comprise a contact to the coupling element, or the RFID-tag may comprise an on-chip coil inductively coupled to the coupling element. Correspondingly, embodiments provide a TPMS device comprising a corresponding coupling element, e.g. a coil or an antenna, configured to provide Radio Frequency (RF) power to the RFID-tag to enable the RFID-tag to provide the information related to the tire identification. That is to say in embodiments the RFID-tag is powered by the TPMS module. Hence, in some embodiments the RFID-tag may be powered indirectly, and may take its power from RF-signals generated by the TPMS module. The RFID-tag may therefore be implemented without any power supply, i.e. without any energy storage, such as a battery, an accumulator, etc. As the RFID-tag may be implemented without power supply, it may also be operated over long time periods without any maintenance. In some embodiments this may be exploited and the RFID-tag may be integrated in a tire.

In some embodiments the RFID-tag can be configured to receive one or more instructions, such as a wake-up or an activation instruction, together with a signal providing power to the RFID-tag. The RFID-tag may comprise an accordingly configured receiver module, which can be coupled to the above power module or coupling element. For example, information related to such an instruction can be modulated onto a radio signal using amplitude modulation or amplitude shift keying. That is to say that in some embodiments the TPMS device may be configured to modulate the RF-signal generated to power the RFID-tag additionally with an according instruction for the RFID-tag. The RFID-tag may, upon reception of said instruction, be activated and it may respond to the TPMS device, for example, by backscattering, i.e. by damping, the RF-signal transmitted by the TPMS device. In some embodiments there may be a handshake procedure between the TPMS device and the RFID-tag. In other words, a communication between the TPMS device and the RFID-tag may involve one or more or a series of instructions and responses according to a predefined protocol.

That is to say in some embodiments the TPMS device may further comprise a transmitter module configured to transmit one or more instructions to the RFID-tag and/or a receiver module configured to receive one or more responses from the RFID-tag, which may then comprise an accordingly configured receiver module. For example, a backscattered RF-signal may be obtained or received by a receiver device or by the TPMS device for further processing, as will be detailed subsequently. In further embodiments the TPMS device may hence be configured to relay information between a receiver device and the RFID-tag, e.g. the receiver device may actually transmit one or more instructions to the TPMS device, which then forwards the one or more instructions to the RFID-tag. Additionally or alternatively, the RFID-tag may transmit a response using an accordingly configured transmitter module, which may be directly received by the receiver device, or by the TPMS device and then forwarded to the receiver device. Hence, the receiver device may comprise accordingly configured receiver and/or transmitter modules to communicate with the RFID-tag directly or indirectly.

Embodiments may therefore also provide a tire for a vehicle comprising an RFID-tag as described herein. In further embodiments the RFID-tag may be molded, glued or un-removably mounted into the tire. That is to say the tire may be provided or manufactured having the RFID-tag already integrated. Tires having RFID-tags already integrated may then be identified right after manufacturing. For example, in warehouses or stocks such tires may already be identified before they are mounted on a vehicle. For example, when tires are mounted on vehicles their RFID-tags may be used to verify that the correct tire is used on the correct vehicle.

In further embodiments the tire may further comprise a TPMS device which is configured to provide information related to the pressure of the tire and the information related to the tire identification. In such embodiments the TPMS device may be mounted on or next to the tire, for example, in close vicinity of the RFID-tag, or it may be mounted on, for example, a rim or a tire valve of a wheel on which the tire is also mounted, where again it would be in the vicinity of the RFID-tag. In some embodiments the TPMS module can be configured to collect or receive the information related to the tire identification from the RFID-tag and forward it to a corresponding receiver device. That is to say, in addition to powering the RFID-tag, further signaling may be used to transfer the information on the tire identification from the RFID-tag to the TPMS module in some embodiments. The TPMS module may then forward said information. In even further embodiments the TPMS device is removably or exchangeably mounted in the vicinity of the RFID-tag such that radio communication between the TPMS module and the RFID-tag is enabled.

In other words, the TPMS device may be removed or replaced, for example as part of maintenance activities of the tire, the wheel, the rim, etc. Therefore, in some embodiments the TPMS device may carry an energy storage device, such as a battery or accumulator, which is then also used to indirectly power the RFID-tag in the tire. While the TPMS device can be replaced, tire identification functionality would still be available after such replacement. Instead of the energy storage the TPMS device may comprise an energy generator, e.g. providing power based on the movement of the wheel. The TPMS device may be equipped with an energy harvester or a nano generator, e.g. as they are used in battery-free TPMS sensors, which convert the mechanical energy of vibrations or of acceleration or deformation when the TPMS sensor hits and leaves the road surface into electrical energy that powers the TPMS sensor.

Embodiments also provide a corresponding receiver device, for example, for a vehicle or a service station. The receiver device comprises a receiver module configured to obtain information related to tire identification from an RFID-tag, wherein the receiver module is configured to obtain the information related to the tire identification from the RFID-tag by demodulating a radio signal influenced by the RFID-tag using amplitude modulation or amplitude shift keying. The radio signal influenced by the RFID-tag may be transmitted by the RFID-tag, by the TPMS device or by another source, e.g. for service or maintenance purposes. Additionally or alternatively, the receiver module is configured to receive information related to a tire pressure by demodulating a radio signal from a TPMS device using frequency modulation, phase modulation or frequency shift keying of a radio frequency carrier. In embodiments the receiver module may correspond to one or more receiver units, one or more receiver devices, any means for receiving, etc. In other words, the receiver module may comprise typical receiver components, such as one or more receive antennas or coils, a low noise amplifier, a mixer, one or more filters, etc.

As it has been mentioned above, in embodiments the communication of the information related to the tire identification from the RFID-tag to an embodiment of the above receiver may be directly or indirectly. In some embodiments said communication is direct, i.e. the RFID-tag is powered by the TPMS device, and then configured to transmit the information related to the tire identification to the receiver device. The receiver module at the receiver device can then be configured to obtain the information related to the tire identification by receiving a signal directly from the RFID-tag. In some embodiments, the RFID-tag may provide the information on the tire identification through the TPMS device, i.e. using the TPMS or influencing signals transmitted by the TPMS device, e.g. damping a radio frequency carrier transmitted by the TPMS device. The receiver module at the receiver device can then be configured to obtain the information related to the tire identification by receiving a signal directly from the TPMS device, wherein the signal from the TPMS device is influenced by the RFID-tag. In other words, the receiver module at the receiver device can then be configured to obtain the information related to the tire identification by receiving a signal indirectly from the RFID-tag, i.e. by means of the influenced signal from the TPMS device. That is to say a signal transmitted by the TPMS device carrying information related to tire pressure may be further influenced by the RFID-tag modulating the signal with further information related to the tire identification on top of the information related to the tire pressure. The TPMS device may not be aware of this procedure and hence, in some embodiments the RFID-tag may absorb the power from the TPMS device and then further influence a radio signal transmitted by the TPMS device. Such embodiments may be efficient since the same TPMS device could be used in tires with RFID-tag as well as in tires without RFID-tag, so tires with RFID-tag may be identified even without having to adapt the TPMS device specifically for that feature.

In embodiments the transmitter module of the RFID-tag can be configured to transmit the information related to the tire identification, for example, using Amplitude Modulation (AM), Amplitude Shift Keying (ASK), or by damping a radio frequency carrier of the TPMS device. In embodiments the TPMS device may comprise a dedicated output to provide RF power to the RFID-tag or it may comprise the above described coupling element, e.g. a coil or an antenna, which may be dedicated to provide RF power to the RFID-tag. In other words, the power is provided by the TPMS device using the coupling element, which may also be used to communicate with the receiver device, or a dedicated coupling element, e.g. a dedicated coil or antenna, may be present just for power provision to the RFID-tag. Correspondingly, the RFID-tag may use its coupling element, which may also be an antenna or coil, to receive the power from the TPMS module, where the antennas or coils can, for example, be tuned to an operating frequency of the TPMS device.

In further embodiments the transmitter module of the RFID-tag can be configured to transmit the information related to the tire identification to the receiver device, e.g. of the vehicle or the service station using the TPMS device. The TPMS device may further comprise a transmitter module configured to transmit information related to a tire pressure to a receiver device at, for example, the vehicle or at the service station. The transmitter module at the TPMS device can then be configured to transmit the information related to the tire pressure to the receiver device using an antenna or the transmitter module can be coupled to another antenna which may then be used to transmit the information related to the tire pressure and the information related to the tire identification to the respective receiver. In yet other embodiments the transmitter module at the TPMS module can be coupled to the RFID-tag using a coil and the transmitter module can be configured to transmit the information related to the tire pressure to the receiver device using yet another antenna coupled to the RFID-tag.

In other words, in these embodiments the RFID-tag may provide the information related to the tire identification to the TPMS module using the corresponding coupling elements at the RFID-tag and the TPMS device, e.g. accordingly tuned coils or antennas. The TPMS device may further determine the information on the tire pressure and then transmit the information related to the tire identification and the information related to the tire pressure together using an antenna, which is also used to power the RFID-tag, an antenna which is used to communicate with the receiver device but not used to power the RFID-tag, or the transmitter module may use an antenna at the RFID-tag, for example, by inductively being coupled to the RFID-tag and then transmit the above information together using the antenna coupled to the RFID-tag. Embodiments may make use of the larger space available for mounting the RFID tag including its antenna(s) in the tire, an area of up to the complete inner tire surface including its sidewalls, whereas the allowed weight of a TPMS module is restricted and it may only have the footprint of a stamp.

In some embodiments, the receiver module at the receiver device, for example, at the service station or the vehicle, can be configured to receive the information related to the tire identification from the TPMS device. In some embodiments the transmitter module at the TPMS device can be configured to transmit the information related to the tire pressure and/or the information related to the tire identification using Frequency Modulation (FM), Phase Modulation (PM) or Frequency Shift Keying (FSK) of a radio frequency carrier. Furthermore, in some embodiments the TPMS device comprises a receiver module configured to receive information related to the tire identification from the RFID-tag. Hence, said receiver module may be implemented as one or more receiver units or one or more receiver devices, any means for receiving, etc. The receiver module may comprise typical receiver components such as a receive antenna or coil, detection or demodulation modules, filters, etc. In some embodiments the receiver module can be configured to receive the information based on a current drawn by a power amplifier comprised in the TPMS device. Corresponding to the transmission options for the RFID-tag, the receiver module of the TPMS device can be configured to receive the information by demodulating a radio signal from the RFID-tag using Amplitude Modulation (AM) or Amplitude Shift Keying (ASK). Moreover, the receiver module may be configured to receive responses to accordingly transmitted instructions from the RFID-tag.

Correspondingly, in some embodiments the receiver module at the receiver device can be configured to receive the information related to the tire identification from the RFID-tag by demodulating a radio signal from the RFID-tag using AM or ASK. In some embodiments the receiver module of the receiver device can be configured to receive the information related to the tire identification by demodulating a radio signal from the TPMS device using FM, PM or FSK of a radio frequency carrier. In some embodiments the receiver module of the receiver device can be configured to receive the information related to the tire identification by demodulating a radio signal from the TPMS device using AM, ASK, e.g. when the RFID-tag has influenced, e.g. damped, the radio frequency carrier transmitted by the TPMS device.

As the above options and different embodiments already show, components of the RFID-tag and the TPMS device may be reused. Such components may be one or more antennas, one or more coils, etc. Embodiments may therefore be efficiently manufactured and provide efficient transmission concepts. Moreover, transmissions of the respective information may be organized together, for example, by the TPMS device using an own or even an antenna or coil of the RFID-tag.

In line with the above description, embodiments may also provide the according methods. Embodiments may provide a method for providing information relating to tire identification. The method comprises using or the usage of a TPMS device to power an RFID-tag in the tire. The method further comprises transmitting or transmission of the information related to the tire identification from the RFID-tag to a receiver device, for example, of a vehicle or a service station. In line with the above description the transmitting or the transmission may comprise transmitting or transmission of the information related to the tire identification to the TPMS device and it may further comprise transmitting or transmission of the information related to the tire identification from the TPMS device to the receiver device, for example of the vehicle or the service station.

Embodiments may further provide a computer readable storage medium storing instructions which, when executed by a computer, cause the computer to implement one of the methods described herein. Embodiments further provide a computer program or computer program product having a program code for performing one of the above described methods, when the computer program or computer program product is executed on a computer, processor or a programmable hardware.

BRIEF DESCRIPTION OF THE DRAWINGS

Some embodiments of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
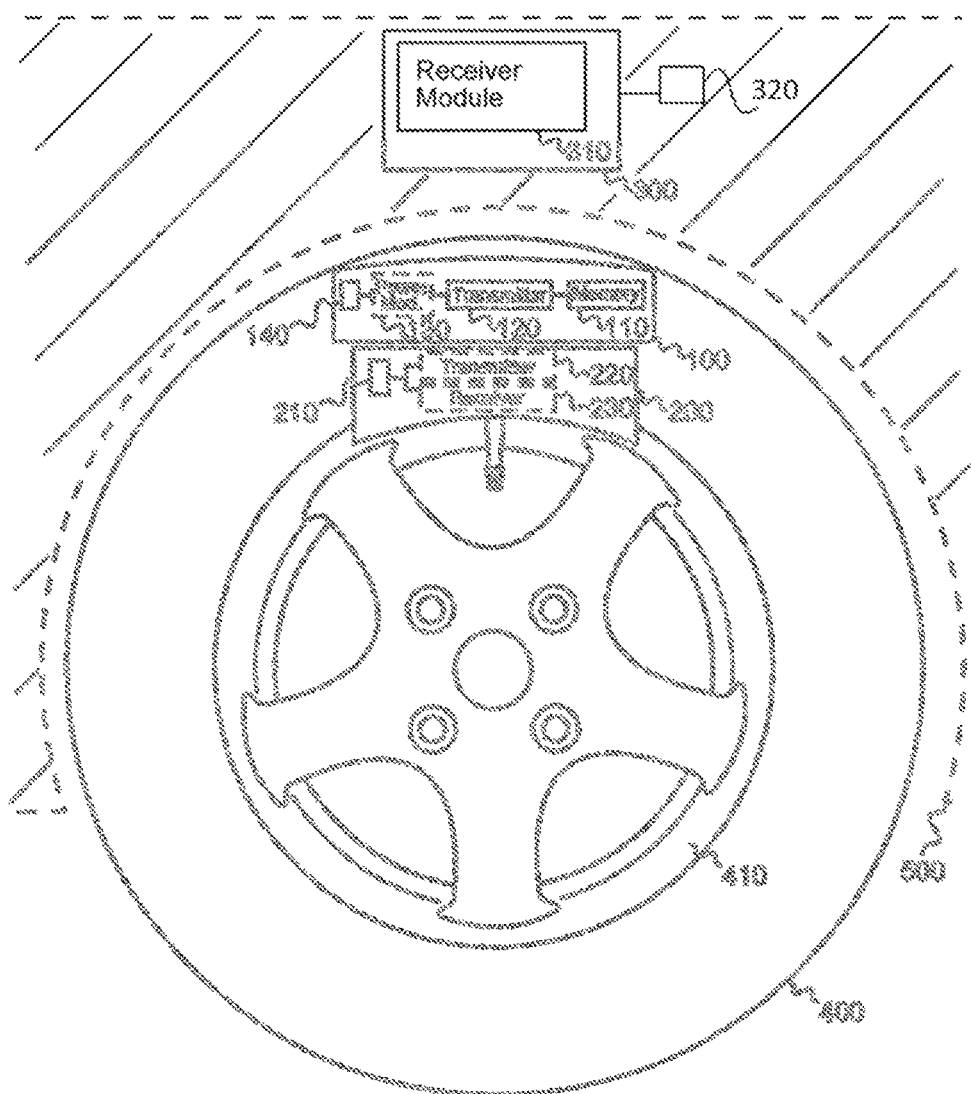
FIG. 1 illustrates an embodiment of an RFID-tag together with an embodiment of a TPMS device and an embodiment of a receiver device.

In the following figures multiple embodiments will be described, which provide information from an RFID-tag 100, having memorized or stored information related to a tire identification, to a vehicle 500 or to a service station by using an in-tire TPMS device 200. FIG. 1 shows a tire 400 on a rim 410 comprising an RFID-tag 100. In the embodiment depicted in FIG. 1 and also in FIG. 2, the RFID-tag 100 is un-removably mounted into the tire 400, for example, it is molded or glued into the tire 400. In other words, the RFID-tag 100 is an un-removable property of the tire 400, for example, glued or molded in the inside of the tire wall. In some embodiments attempts to remove or to transfer the RFID-tag 100 to another tire would lead to a destruction of the RFID-tag 100. As indicated in FIG. 1 the RFID-tag 100 is configured to or operable to provide information related to tire identification. The RFID-tag 100 is configured to be powered by the TPMS device 200, which is also shown in FIG. 1 and which will be detailed subsequently. The RFID-tag 100 comprises a memory module 110 which is configured to store the information related to the tire identification. In embodiments such information may correspond to a digital representation of a large number, such that the number may represent one type of tire, with its according properties. In some embodiments the identification may be unique for a certain kind of tire 400. This may be achieved by using large numbers, or numbers with enough digits such that a proper identification of the tire and an associated mapping to the respective properties is made possible.

As further shown in FIG. 1, the RFID-tag 100 comprises a transmitter module 120, which is coupled to the memory 110. The transmitter module 120 is configured to transmit the information related to the tire identification to a receiver device 300, which is exemplified as a receiver device of a vehicle 500 and it may correspond to a receiver device of a service station. In the embodiment shown in FIG. 1 the receiver device 300 is a component of the vehicle 500 and the receiver module is configured to obtain the information related to the tire identification from the RFID-tag by demodulating a radio signal influenced by the RFID-tag using amplitude modulation or amplitude shift keying. It may also be configured to receive information related to a tire pressure by demodulating a radio signal from a TPMS device using frequency modulation, phase modulation or frequency shift keying of a radio frequency carrier. In some embodiments, the receiver device 300 may be further coupled to an output 320 for generating a warning. In the embodiment shown in FIG. 1 the transmitter module 120 is further coupled to an optional power module 130, which is further coupled to an optional coupling element 140, e.g. an antenna or a coil. The power module 130 is configured to power the RFID-tag 100 by receiving energy through the coupling element 140 from the TPMS device 200. That is to say the RFID-tag 100 comprises a contact to the coupling element 140 or it may comprise an on-chip coil inductively coupled to the coupling element 140, as will be detailed subsequently.

In other words the RFID-tag 100 may comprise an RFID chip, on which the memory 110 and the transmitter module 120 are implemented and an RF-interface, which may correspond to the above contact or coupling element 140, e.g. an antenna or a coil. The RFID chip 105 may be contacted to the coupling element 140 or it may have an on-chip coil, which can be inductively coupled to yet another coil, to one or more antennas tuned to an operating RF-frequency or to possible RF-frequencies of the TPMS module 200, or the coupling element 140. That is to say in the present embodiment as depicted in FIG. 1 the coupling element 140 is tuned to an operating frequency of the TPMS device 200, for example, to one of the Industrial, Scientific and Medical bands (ISM) as, for example, 315 MHz, 434 MHz, etc. The TPMS device 200 also comprises a coupling element 210, e.g. an antenna or a coil, configured to provide RF power to the RFID-tag 100 to enable provision of the information related to the tire identification. The TPMS device 200 may comprise a dedicated output to provide RF power to the RFID-tag 100, wherein the coupling element 210 can also be dedicated or used for multiple purposes among which is the provision of the RF power to the RFID-tag 100. In the embodiment depicted in FIG. 1 the TPMS device 200 further comprises a transmitter module 220 which is also coupled to the coupling element 210, e.g. the same or another antenna or coil, and which is configured to transmit information related to a tire pressure to the receiver device 300 of the vehicle 500, additionally or alternatively to a service station.

Figure 2:
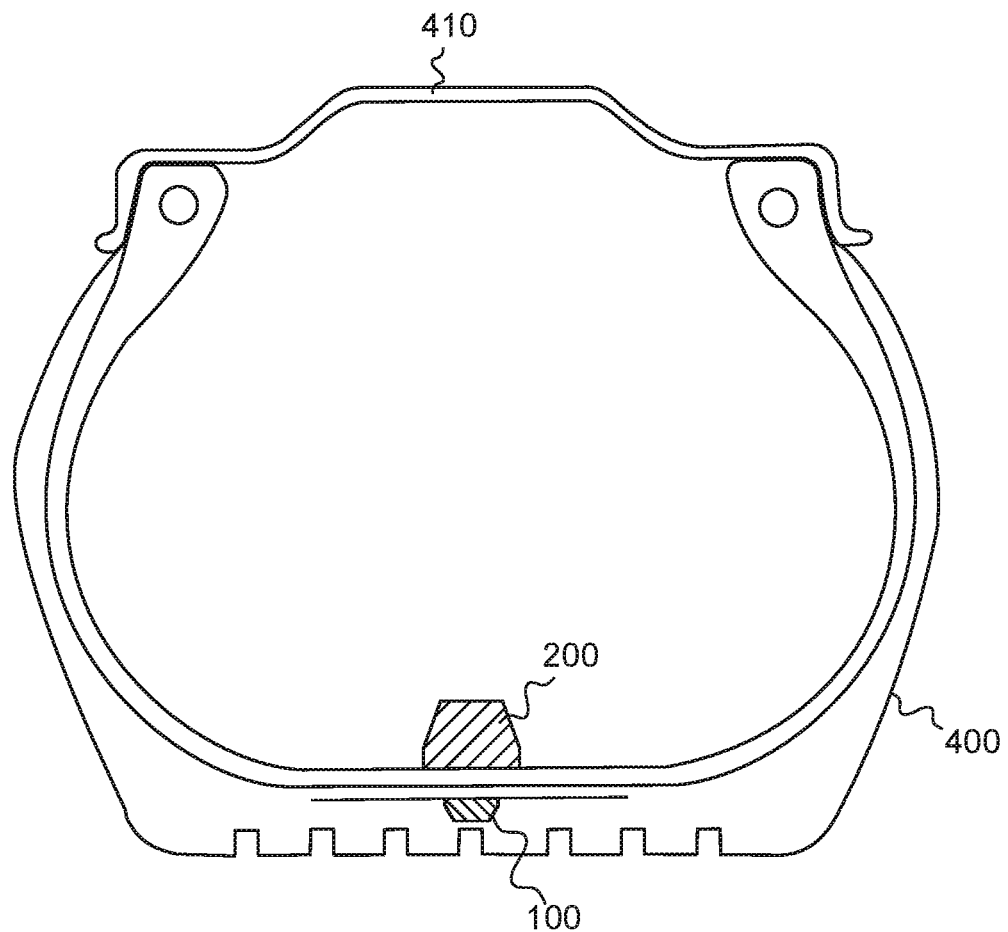
FIG. 2 shows an implementation of an embodiment of an RFID-tag and an embodiment of a TMPS module in a tire.
Figure 3:
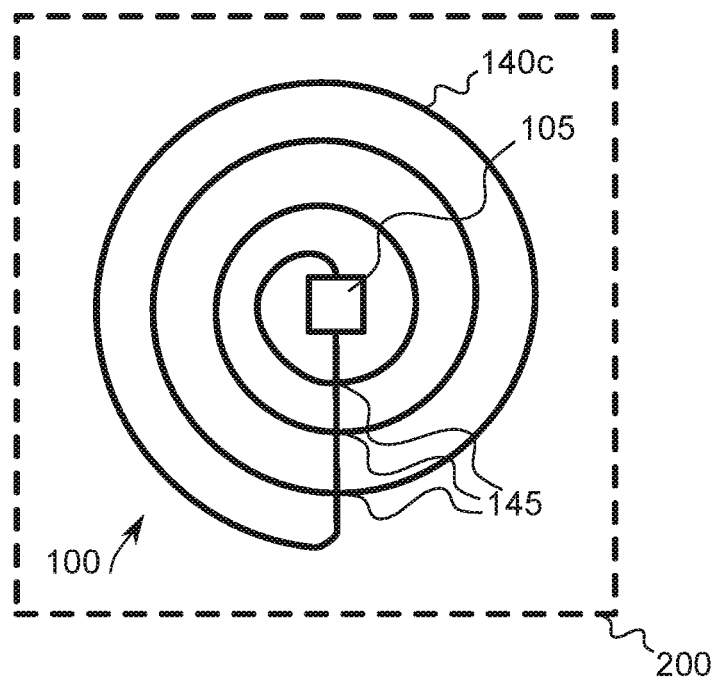
FIG. 3 shows an embodiment of an RFID-tag with a coil.

In the embodiments depicted in FIGS. 1 and 2 it is assumed that the TPMS device 200 is removably or exchangeably mounted in the vicinity of the RFID-tag 100 such that radio communication between the TPMS device 200 and the RFID-tag 100 is enabled. In other words FIGS. 1 and 2 also depict an embodiment of a tire 400 in which the TPMS module or device 200 is removable or exchangeable. Moreover, the TPMS module 200 is suitably mounted in close vicinity or directly above or below the RFID-tag 100. In embodiments the TPMS module 200 may measure tire parameters like pressure and other parameters and it may transmit the measurement results as a data stream using radio frequency communication. That is to say the TPMS device 200 is configured to provide information related to a pressure of the tire 400 and, in some embodiments, it is also configured to provide information related to the tire identification from the RFID-tag 100. As already mentioned above, for the radio frequency communication, be it for the communication with the RFID-tag 100 or for the communication with the receiver device 300, ISM-band-frequencies like 315 MHz, 434 MHz and others may be used in embodiments, and the particular utilization of the frequency band may depend on the regulations of the different countries.

The TPMS device 200 may be configured or even optimized to transmit the RF power efficiently. As indicated in FIG. 1 the TPMS device 200 uses the coupling element 210 to transmit the RF power. A portion of the RF-output-power is then coupled to the coupling element 140 of the RFID-tag 100. Optionally, the TPMS device 200 may provide a wake-up or an activation instruction to the RFID-tag 100 using the RF-signal. As will be further explained subsequently with the help of the following figures, several options exist on how the RF-output-power is coupled to the RFID-tag 100. In the following some embodiments will be described in the coupling element 210 correspond to an antenna 210a or a coil 210c; correspondingly the coupling element 140 may correspond to an antenna 140a or a coil 140c. A first option in some embodiments uses a dedicated coil 210c at the TPMS device 200, as a second option a dedicated antenna 210a can be used at the TPMS device 200. A third option that may be implemented in embodiments is that an antenna 210a of the TPMS module or device 200 that is used to communicate with the receiver 300 of the vehicle 500 or of the service station is used to transfer the RF power to the RFID-tag 100. Hence in some embodiments the coupling element 210 at the TPMS device 200 can be a dedicated coil 210c or a dedicated antenna 210a at the TPMS device 200, which is dedicated to power the RFID-tag 100. In embodiments, part of the power emitted by the TPMS device 200 may be used to power the RFID-tag 100, which may use its coupling element 140, e.g. antenna 140a or coil 140c to couple to the TPMS device 200 in order to receive the power.

In embodiments different options for the communication between the RFID-tag 100, the TPMS device 200, and the receiver device 300 are conceivable. The RFID-tag 100 may communicate with the TPMS device 200 or with the receiver device 300, or even other receivers, by damping the received power from the TPMS device 200 according to an RFID-tag 100-unique and therefore tire 400-unique pattern. The TPMS device 200 may receive the information related to the tire identification from the RFID-tag 100. That is to say in some embodiments the TPMS device 200 comprises a receiver module 230, as indicated as optional module in FIG. 1, which is configured to receive the information related to the tire identification from the RFID-tag 100.

In embodiments the receiver device 300 for the vehicle 500 or the service station comprises a receiver module 310 configured to receive the information related to the tire identification from the RFID-tag 100. In some embodiments the receiver module 310 is configured to receive the information related to the tire identification through or from the TPMS device 200, which may then relay the information related to the tire identification from the RFID-tag 100 to the receiver device 300. In some embodiments the receiver module 230 at the TPMS device 200 can be configured to receive the information from the RFID-tag 100 based on a current drawn by a power amplifier in the TPMS device 200. In other embodiments the receiver module 230 at the TPMS device 200 can be configured to receive the information by demodulating a radio signal from the RFID-tag 100 using AM or ASK. Correspondingly the transmitter module 120 at the RFID-tag 100 can be configured to transmit the information related to the tire identification using AM, ASK, or by damping a radio frequency carrier of the TPMS device 200. Hence, in some embodiments the TPMS device 200 may receive the information from the RFID-tag 100 with the dedicated receiver 230 at the RF frequency or by monitoring the current drawn by its power amplifier, which can be an indicator of the damping activity of the RFID-tag 100.

In other embodiments the RFID-tag 100 may also communicate directly with the receiver 300 of the vehicle 500 or of the service station, where multiple options are conceivable in embodiments. In some embodiments the TPMS device 200 may transmit its data by FM, PM, or FSK modulating its constant power RF carrier. That is to say the transmitter module 220 at the TPMS device 200 can be configured to transmit the information related to the tire pressure and/or information related to the tire identification using FM, PM, or FSK on its RF carrier. In some embodiments the RFID-tag 100 may transmit its data using the AM, ASK, or the damping of the RF carrier of the TPMS device 200 according to the RFID-tag-unique and therefore tire-unique pattern. Accordingly, the receiver device 300, at the vehicle 500 or at the service station may receive data from the TPMS device 200 by FM, PM or FSK demodulation of a received signal, and in some embodiments it may receive data from the RFID-tag 100 by using AM or ASK demodulation of the receive signal from the RFID-tag 100.

That is to say, in some embodiments the receiver device 300 receives the respective information from the RFID-tag 100 and the TPMS device 200 simultaneously on the same carrier using different modulations. In other words, in embodiments the receiver module 310 at the receiver device 300 can be configured to receive the information related to the tire identification from the RFID-tag 100 by demodulating a radio signal from the RFID-tag 100 using AM or ASK demodulation, or by demodulating the radio signal, which was influenced by the RFID-tag but transmitted by the TPMS device or by another source using AM or ASK demodulation. Additionally or alternatively the receiver module 310 can be configured to receive information related to the tire identification and/or information related to the tire pressure by demodulating a radio signal from the TPMS device 200 using FM, PM, or FSK demodulation of the RF carrier from the TPMS device 200.

Summarizing the above, in some embodiments double use of the TPMS device 200 may be made. The TPMS device 200 may be used to transmit pressure and other measurement data or information to the vehicle 500 or the service station, which uses the receiver device 300. Moreover, the TPMS device 200 can be used to transmit the individual tire identification to the vehicle 500 or the service station using the receiver device 300, by using an RF path to power the RFID-tag 100 of the tire 400 and to transfer information from the RFID-tag 100. Such information may be transferred directly to the receiver 300 of the vehicle 500 or of the service station or indirectly, via the TPMS module 200, and then to the receiver 300 of the vehicle 500 or the service station. FIG. 2 shows a cross section of the tire 400 on the rim 410, where the TPMS module 200 is mounted on the inside of the tire 400 while the RFID-tag 100 is mounted just below the TPMS module 200 in the tire 400, just above the tire tread. In the following figures several options for arrangements between the coupling elements 140, 210, e.g. antennas 140a, 210a or coils 140c, 210c at the RFID-tag 100 and the TPMS device 200 will be explained.

As it has already been described above, in embodiments the transmitter module 220 at the TPMS device 200 is configured to transmit information related to the tire pressure to the receiver device 300 at the vehicle 500 or at the service station. In some embodiments the transmitter module 220 can be configured to transmit the information related to the tire pressure to the receiver device 300 using the same antenna 210a as it uses to power the RFID-tag 200. In some embodiments the transmitter module 220 can be coupled to another antenna and it can be configured to transmit the information related to the tire pressure to the receiver device 300 using the other antenna. In other words, in some embodiments the transmitter module 220 may use separate antennas, one for powering the RFID-tag 100 and another one for transmitting information to the receiver device 300. In other embodiments the transmitter module 200 can be coupled to the RFID-tag 100 using a coil 210c, and the transmitter module 220 can be configured to transmit the information related to the tire pressure to the receiver device 300 using yet another antenna coupled to the RFID-tag 100.

In other words in some embodiments the TPMS device 200 may use an antenna implemented at the RFID-tag 100.

As FIG. 2 indicates, the area available for the implementation of the RFID-tag 100 may be larger than the area of the TPMS module 200, which can be exchangeable for maintenance purposes. As the RFID-tag 100 may provide room for a larger antenna or coil with a better efficiency, in some embodiments the TPMS device 200 may use the antenna of the RFID-tag 100. For example, the coupling between the TPMS module 200 and the RFID-tag 100 can be inductively, using one or more coils, i.e. coupling elements 140, 210, at the TPMS-device 200 and at the RFID-tag 100. In the following embodiments it is assumed that the TPMS module 200 is mounted directly above the RFID-tag 100, its coupling element 210, e.g. coil or antenna, respectively. The following figures show some possible implementations of embodiments of the RFID-tag 100 in relation to the TPMS device 200. In FIGS. 3 to 9 the TPMS module or device 200 is represented by its square shaped footprint, shown in dotted lines. The respective embodiments of the RFID-tag 100 are shown on top of the footprint of the TPMS module 200.

Embodiments of the RFID-tag 100 comprise a coupling element 140, which can be implemented as an antenna or coil. In the following implementations of the coupling element 140 will be referred to as coil 140c or antenna 140a. In embodiments the TPMS module 200 comprises a coupling element 210, which can be implemented as a coil 210c or an antenna 210a. In the embodiment illustrated in FIG. 3 the RFID-tag 100 comprises an RFID chip 105 with contacts to a coil 140c. In the implementation shown in FIG. 3 the coil 140c has a crossover section 145 with a second layer on the die or substrate. The crossovers 145 on the second layer are configured to prevent electrical shortages of the coil 140c. In the embodiment shown in FIG. 3 the TPMS module 200 may couple RF power inductively into the coil 140c of the RFID-tag 100. The RFID chip 105 is accordingly contacted to the coil 140c and therewith retrieves its power from the TPMS module 200.

Figure 4:
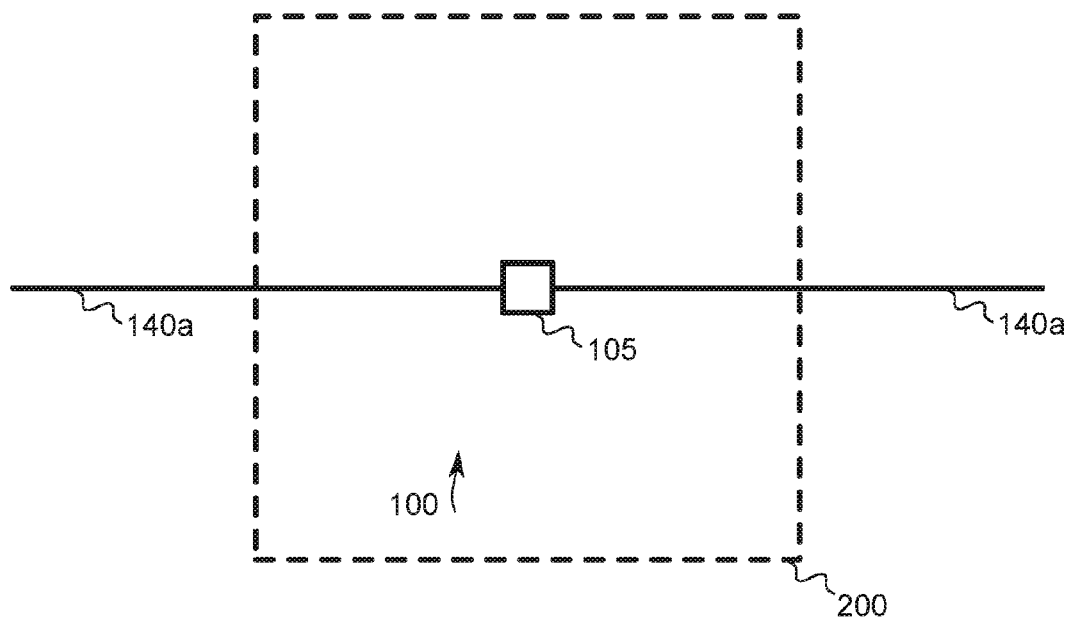
FIG. 4 shows an embodiment of an RFID-tag with an antenna.

FIG. 4 shows another embodiment of the RFID-tag 100 together with the footprint of the TPMS module 200. In the embodiment shown in FIG. 4 the RFID-tag 100 comprises an RFID chip 105 which is coupled to an antenna 140a as coupling element 140. The RFID chip 105 comprises contacts to the antenna 140a and the antenna 140a can, for example, be a linear or a meandered antenna. FIG. 4 shows embodiments wherein the TPMS module 200 may couple RF power into the RF antenna 140a of the RFID-tag 100. The RFID chip 105 is contacted to the antenna 140a and therewith receives the RF power from the TPMS device 200.

Figure 5:
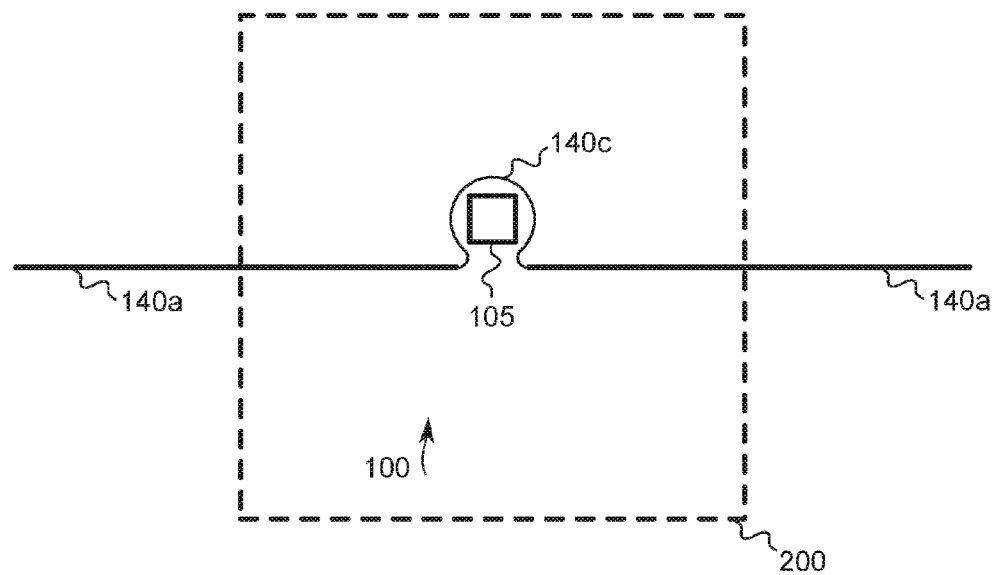
FIG. 5 shows an embodiment of an RFID-tag with inductive coupling to an antenna.

FIG. 5 illustrates another embodiment of an RFID-tag 100 and is shown together with the footprint of a TPMS module 200. In the embodiment shown in FIG. 5 the RFID-tag 100 comprises an RFID chip 105 with an on-chip coil. Said on-chip coil is coupled inductively using another coil 140c to an antenna 140a. Said antenna 140a may again be implemented, for example, in a linear, meandered, or any other way. In the embodiment illustrated in FIG. 5 the TPMS module 200 may couple RF power into the RF antenna 140a of the RFID-tag 100. The RFID chip 105 is inductively coupled to the RF antenna 140a using an on-chip coil and coil 140c.

Figure 6:
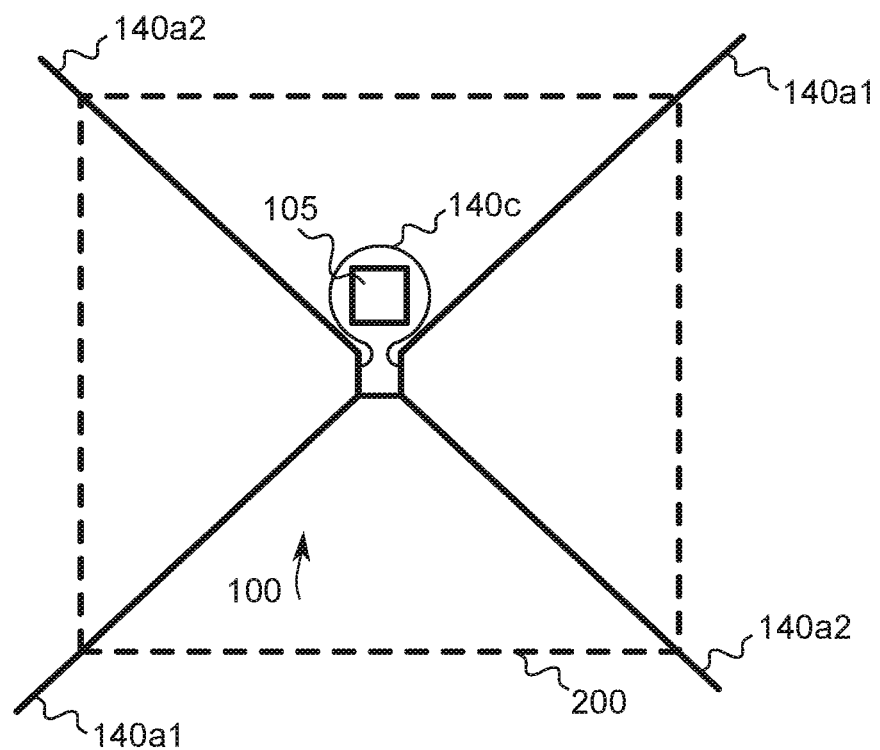
FIG. 6 shows an embodiment of an RFID-tag with inductive coupling to two antennas.

FIG. 6 illustrates another embodiment of an RFID-tag 100 together with the footprint of the TPMS module 200. In the embodiment shown in FIG. 6 the RFID-tag 100 comprises an RFID chip 105 with an on-chip coil. The on-chip coil of the RFID chip 105 is inductively coupled to coil 140c, which is in this embodiment coupled or connected to two antennas 140a1 and 140a2. The coupling of the RFID chip 105 to the antennas 140a1 and 140a2 is done inductively using the on-chip coil and coil 140c. Furthermore, the first antenna 140a1 is configured for a different frequency than the second antenna 140a2. In other words, the first antenna 140a1 is configured for a first frequency and the second antenna 140a2 is configured for a second frequency. In the embodiment shown in FIG. 6 the TPMS module 200 may couple RF power into the RF antennas 140a1 and/or 140a2 of the RFID-tag 100. The RFID chip 105 is inductively coupled to the respective RF antennas 140a1 and 140a2.

Figure 7:
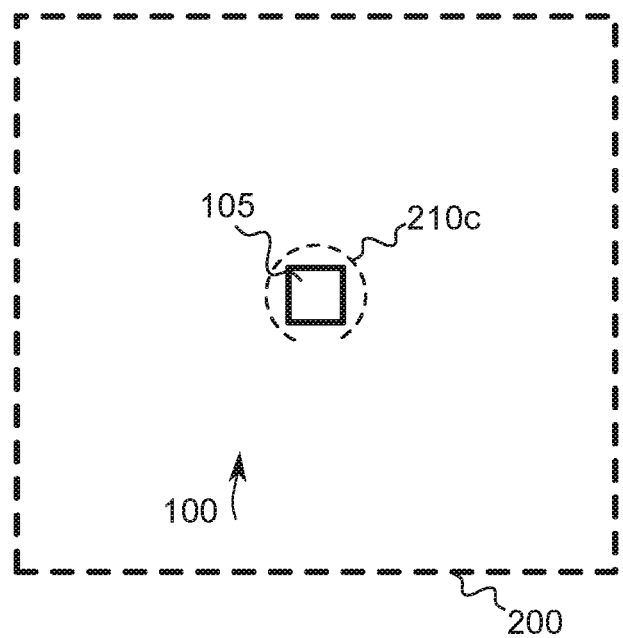
FIG. 7 illustrates an embodiment of a TPMS module inductively coupled to an embodiment of an RFID-tag or -chip.

FIG. 7 illustrates yet another embodiment of the RFID-tag 100 together with the footprint of the TPMS device 200. In the embodiment shown in FIG. 7 the RFID-tag 100 comprises an RFID chip 105 with an on-chip coil. The RFID chip 105 is at least partly surrounded by a coil 210c, i.e. the coupling element, of the TPMS module 200. FIG. 7 shows an embodiment wherein the coupling element 210 of the TPMS module or device 200 is implemented as a coil 210c. In this embodiment the TPMS module 200 couples RF power inductively into the on-chip coil of the RFID chip 105.

Figure 8:
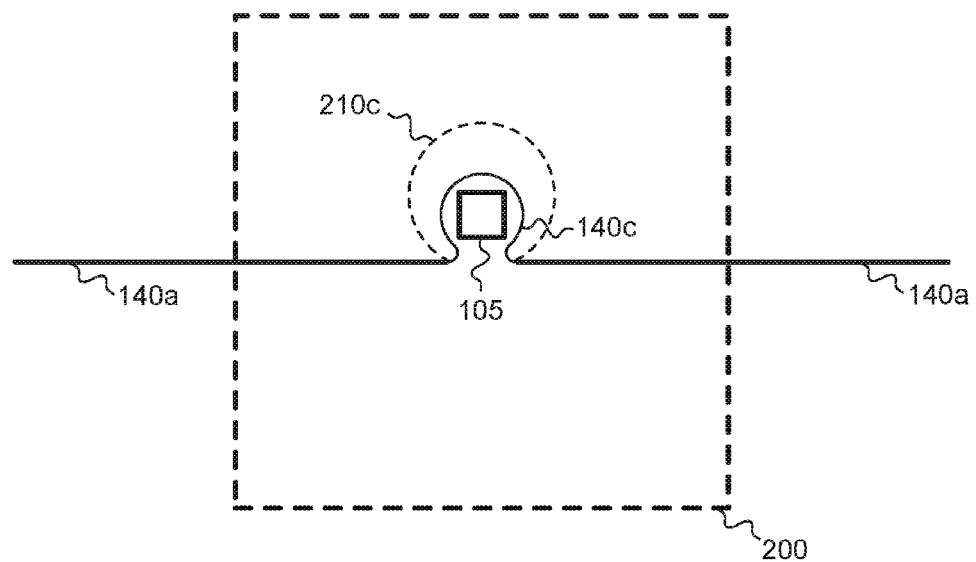
FIG. 8 illustrates an embodiment of a TPMS device and an embodiment of an RFID-tag being inductively coupled to a separated antenna.

Yet another embodiment is illustrated in FIG. 8. FIG. 8 shows an embodiment of the RFID-tag 100 together with a footprint of the TPMS module 200 and a coil 210c as coupling element 210 of the TPMS module 200. The RFID-tag 100 comprises an RFID chip 105 with an on-chip coil. Moreover, the RFID-tag 100 comprises a coil 140c which is coupled to an antenna 140a as coupling element 140. Again, the antenna 140a can, for example, be implemented in a linear, in a meandered, or any other way. In the embodiment shown in FIG. 8 the TPMS module 200 couples its RF power inductively into the on-chip coil of the RFID chip 105 and into the RF antenna 140a of the RFID-tag 100, using the RF antenna 140a of the RFID-tag 100 to transmit RF power. In other words the TPMS module 200 may not have an own RF antenna but only the coupling coil 210c, which allows using the antenna 140a of the RFID-tag 100. As there may be more room for implementing the RFID-tag 100 and especially the antenna 140a than for the TPMS device 200, antenna 140a may provide a better efficiency than a much smaller antenna implemented at the TPMS device 200.

Figure 9:
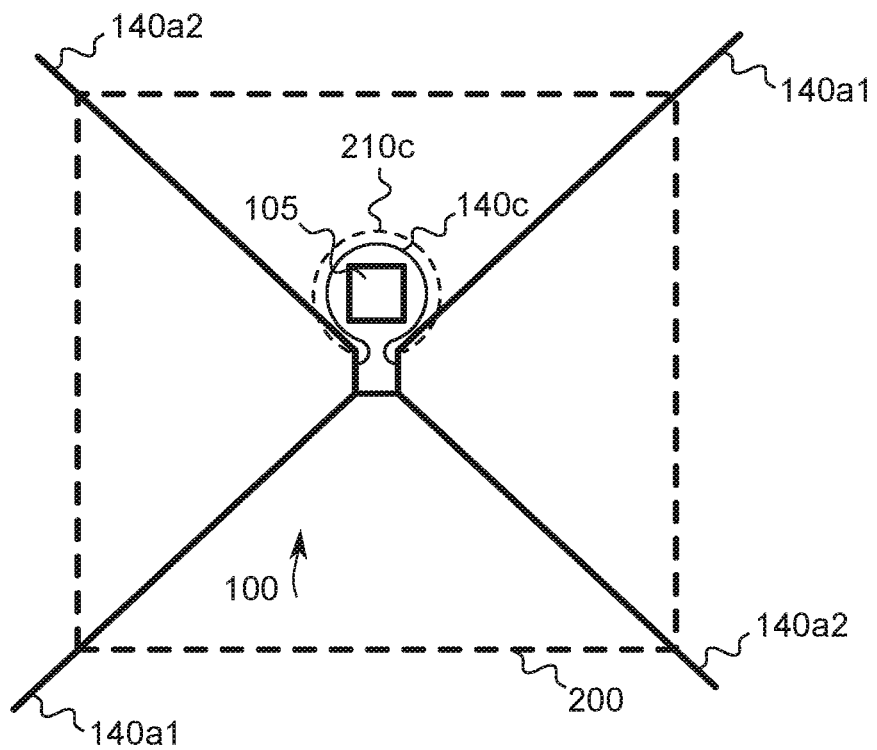
FIG. 9 illustrates an embodiment of a TPMS device and an embodiment of an RFID-tag being inductively coupled to multiple antennas.

FIG. 9 illustrates another embodiment of an RFID-tag 100 together with the footprint of a TPMS module 200. Similar to the embodiments of FIGS. 7 and 8, in the embodiment of FIG. 9 the TPMS module 200 comprises a coil 210c in order to inductively couple to the RFID-tag 100. In this embodiment the RFID-tag 100 comprises an RFID chip 105 with an on-chip coil. The RFID-tag further comprises a coil 140c, which is coupled to two antennas 140a1 and 140a2 similar to the embodiment described in FIG. 6. Again the first antenna 140a1 is configured for a first frequency and the second antenna 140a2 is configured for a second frequency. As said before, the antennas 140a1 and 140a2 may be linear, meandered, or have any other useful shape. In this embodiment the TPMS module 200 may couple its RF power inductively into the on-chip coil of the RFID chip 105 and into the RF antennas 140a1 and 140a2 of the RFID-tag 100, and use the RF antennas 140a1 and 140a2 of the RFID-tag 100 to transmit information to a receiver device 300. The TPMS module 200 uses the coil 210c to inductively couple to either of the antennas 140a1 and 140a2 or the RFID chip 105. Hence, in such an embodiment the TPMS module 200 may not have an own RF antenna.

In some embodiments the RF antenna 210 of the TPMS device 200, which may correspond to a loop antenna, or the matching network between the RF antenna 210 and the power amplifier of the TPMS chip or module 200 or dedicated coil or dedicated antenna may couple RF power into the coil/antennas 140c, 140a1, 140a2, 140 of the RFID-tag 100. The RF power may hence be provided to the RFID chip 105 and power it. The RFID-tag 100 may then transmit a data stream to the TPMS module 200 or to a different receiver 300 by damping said RF power. The TPMS module 200 may detect and/or demodulate the data stream coming from the RFID-tag 100. This data can be sent or transmitted to the receiver device 300, for example at the vehicle 500, via the same RF-link as used for transmitting the pressure measurement and other data.

Figure 10:
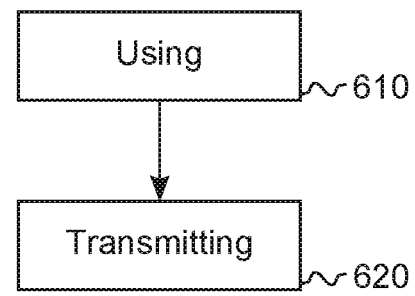
FIG. 10 illustrates a block diagram of a flow chart of an embodiment of a method for providing tire identification.

FIG. 10 illustrates a block diagram of a flow chart of an embodiment of a method for providing information related to a tire identification. The method comprises an action of using 610 the TPMS device 200 to power an RFID-tag 100 in the tire 400. The method further comprises an action of transmitting 620 the information related to the tire identification from the RFID-tag 100 to a receiver device 300, for example, of a vehicle 500 or a service station. In some embodiments the action of transmitting 620 may comprise transmitting the information related to the tire identification to the TPMS device 200 and further transmitting the information related to the tire identification from the TPMS device 200 to the receiver device 300 of the vehicle 500 or the service station.

Embodiments may further provide a computer program having a program code for performing one of the above methods, when the computer program is executed on a computer or processor. A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventors to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for storing", "means for transmitting", "means for transmitting", "means for receiving", etc., may be provided through the use of dedicated hardware, such as "a memory or a storage", "a transmitter", "a receiver", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A system comprising:
   a tire;
   an RFID tag integrated into the tire and configured to store information related to the tire's identification;
   a tire pressure monitorinGg device mounted to the tire and configured to power the RFID tag by providing RF power, wherein the RFID tag and the tire pressure monitoring device are discrete components that do not reside on a common substrate, thereby facilitating the tire pressure monitoring device to be exchangeably mounted with respect to the RFID tag; and
   a transmitter module mounted to the tire and configured to transmit the information related to the tire's identification to a receiver device external of the tire.

2. The system of claim 1, wherein the RFID tag is integrated into the tire such that the integration lasts for a lifetime of the tire.

3. The system of claim 1, wherein the RFID-tag is molded, glued, or un-removably mounted into the tire.

4. The system of claim 1, wherein the tire pressure monitoring device is configured to indirectly provide RF power to the RFID tag in the tire.

5. The system of claim 4, wherein the RFID tag and the tire pressure monitoring device are coupled to coils or antennas to provide the RF power from the tire pressure monitoring device to the RFID tag.

6. The system of claim 1, wherein the transmitter module is further configured to transmit information related to tire pressure of the tire to the receiver device.

7. The system of claim 1, wherein the RFID tag is configured to indirectly transmit the information related to the tire's identification using a signal generated by the transmitter module.

8. A tire identification system for a vehicle, comprising
   a tire;
   an RFID tag integrated into the tire and configured to store information related to the tire's identification;
   a tire pressure monitoring device mounted to the tire, wherein the RFID tag and the tire pressure monitoring device are discrete components that do not reside on a common substrate, thereby facilitating the tire pressure monitoring device to be exchangeabley mounted with respect to the RFID tag;
   a transmitter mounted to the tire and configured to transmit the information related to the tire's identification; and
   a vehicle module to receive the information related to the tire's identification.

9. The tire identification system of claim 8, further comprising a control module to verify that the tire is the correct type to be used on the vehicle.

10. The tire identification system of claim 9, wherein the control module is further configured to verify that the tire is operated within the tire's limitations.

11. The tire identification system of claim 8, wherein the tire pressure monitoring device is configured to power the RFID tag.

12. The tire identification system of claim 11, wherein the tire pressure monitoring device is configured to power the RFID tag using RF power.

13. The tire identification system of claim 12, wherein the RFID tag and the tire pressure monitoring device are coupled to coils or antennas to provide the RF power from the tire pressure monitoring device to the RFID tag.

14. The tire identification system of claim 8, wherein the RFID tag is molded, glued, or un-removably mounted into the tire.

15. A control system for a vehicle, comprising
a tire mounted on the vehicle;
an RFID tag integrated into the tire and configured to store information related to the tire's identification;
a tire pressure monitoring device mounted to the tire, wherein the RFID tag and the tire pressure monitoring device are discrete components that do not reside on a common substrate, thereby facilitating the tire pressure monitoring device to be exchangeably mounted with respect to the RFID tag;
a transmitter mounted to the tire and configured to transmit the information related to the tire's identification; and
a control module to receive the information related to the tire's identification from the tire module and to verify that the tire is operated within the tire's limitations.

16. The control system of claim 15, wherein the control module is configured to generate a warning if the tire is not operated within the tire's limitations.

17. The control system of claim 15, wherein the tire pressure monitoring device is configured to power the RFID tag by providing RF power.

18. A method for identifying a tire in a system comprising the tire, the tire comprising an RFID tag and a tire pressure monitoring device wherein the RFID tag and the tire pressure monitoring device are discrete components that do not reside on a common substrate, thereby facilitating the tire pressure monitoring device to be exchangeably mounted with respect to the RFID tag, and a transmitter module, the method comprising
providing RF power using the tire pressure monitoring device;
powering the RFID tag using the RF power;
transmitting identification information from the RFID tag using the transmitter module; and
identifying the tire based on the identification information.

19. The method of claim 18 further comprising receiving the identification information using a receiver device external to the tire.

* * * * *